M. TIBBETTS.
MOTOR VEHICLE.
APPLICATION FILED SEPT. 14, 1916.
1,369,946.
Patented Mar. 1, 1921.
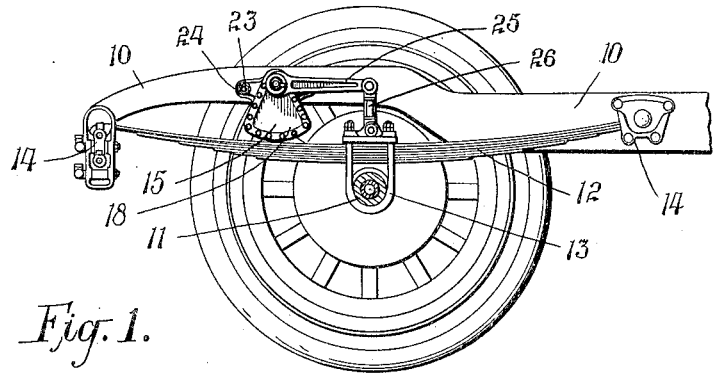
Fig. 1.
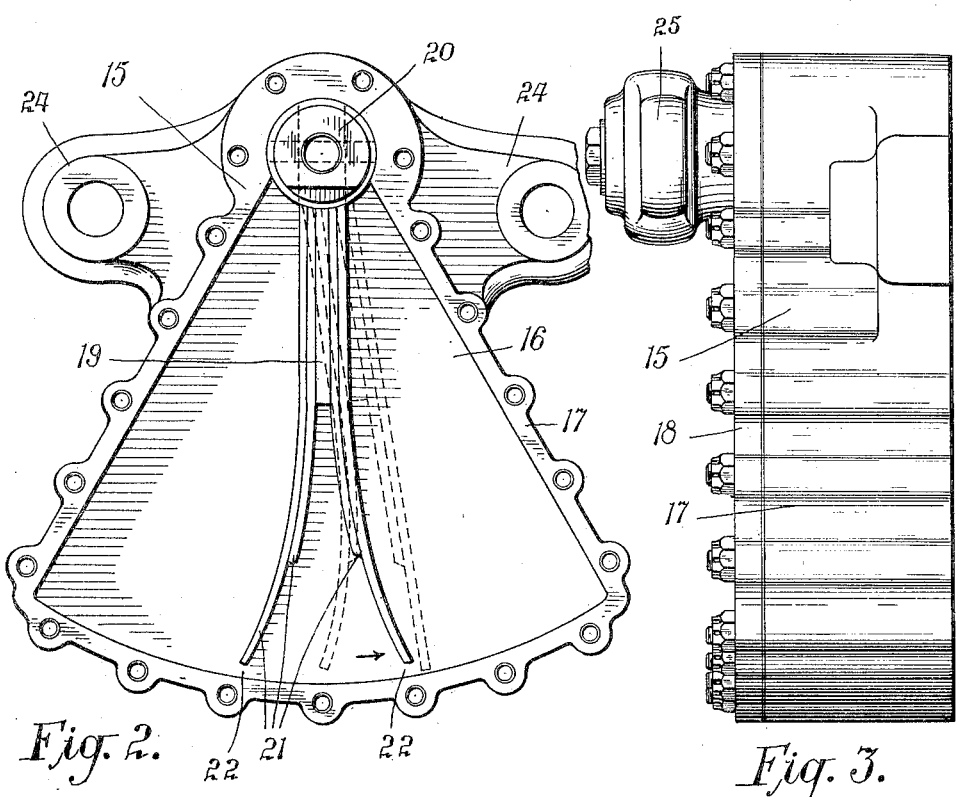
Fig. 2.
Fig. 3.
Witness:
J. E. L. Blackmore
Inventor:
Milton Tibbetts.

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,369,946.  Specification of Letters Patent.  Patented Mar. 1, 1921.

Application filed September 14, 1916. Serial No. 120,089.

*To all whom it may concern:*

Be it known that I, MILTON TIBBETTS, a citizen of the United States, and resident of Detroit, Wayne county, State of Michigan, have invented certain new and useful Improvements in Motor-Vehicles, of which the following is a specification.

This invention relates to improvements in shock absorbing devices and particularly to a shock absorber employing fluid resistant means.

One object of the invention is to provide a shock absorber of the kind specified which will present greater resistance to a heavy or sudden shock than to a slight shock.

Another object of the invention is to provide in a shock absorber of the kind specified a variable passage for the resistant fluid adapted to be reduced in size by means under the control of the compressed fluid.

Another object of the invention is to provide in a shock absorber of the kind specified a partition relatively movable and so formed that any more or less sudden relative movement will tend to straighten out the partition through the compression of the fluid, and reduce the size of the fluid passage.

Other objects of the invention will appear from the following description taken in connection with the drawings, which form a part of this specification, and in which:—

Figure 1 is a side elevation of part of a motor vehicle embodying this invention;

Fig. 2 is a side elevation of one form of the invention with the cover removed; and Fig. 3 is an end view of the same form ready for installation.

In the drawings 10 designates the frame of a motor vehicle on which the shock absorber is applied, and 11 designates the rear axle on which the frame is mounted through springs 12. The springs are secured, intermediate their ends to the rear axle 11 by a yoke 13, and are secured, at their ends, to the frame 10 through suitable spring shackles 14. Obviously therefore, any movement of the rear axle is transmitted to the springs, which absorb a portion of the movement as it passes to the frame. In order to retard the relative motion between the rear axle and the frame a shock absorbing device 15 is employed.

The shock absorbing device referred to comprises a fluid filled chamber 16 made up of a casing 17 and cover 18 detachably secured thereto. In the chamber is a partition 19 movable relatively thereto and dividing the chamber into two compartments. The partition 19 is secured to a shaft 20 mounted transversely in the casing and extending outwardly therefrom, and it consists of a series of spring plates 21 of varying lengths. Between the end of the partition and the casing 17 is a passageway 22 by which the fluid in the chamber can pass from one compartment to the other, the sides of the partition extending to the casing and the cover so that the fluid can travel from one compartment to the other only through the passageway 22.

The partition 19 is of unusual construction being adapted to vary its form and so change the size of the passageway 22. When the partition is in its normal state the passageway is large but when the partition is actuated by a heavy or sudden shock it tends to close the passageway, and to thereby retard the relative movement of the parts to which the partition and casing are connected. The drawings show one form of partition which has the desired properties. This partition is made up of five spring plates the inner one being the shortest and the outer ones the longest. The outer and intermediate plates are normally curved as shown in Fig. 2. In its normal state therefore the partition leaves a comparatively large passage but when a heavy or sudden shock operates the partition quickly to another position the advance outer and intermediate plates straighten out thus reducing the size of the passageway. In Fig. 2 the normal state of the partition is shown in full lines and the second position with the advance plates straightened is shown in dotted lines the direction of the impulse being indicated by the arrow.

The casing 17 of the shock absorbing device is rigidly secured to the frame 10 by bolts 23 passing through ears 24 here shown integral with the casing. The projecting end of the shaft 20, which carries the partition 19, is connected to the yoke 13 by a bar 25 rigidly secured at one end to the shaft 20 and pivoted at the other end to an upright 26 which is in turn pivotally mounted on the yoke 13.

Any movement of the axle relative to the frame will through the connections recited cause the shaft 20 and partition 19 to move in the chamber 16. When the movement is sudden, the fluid, which may be any suitable liquid, or semi-liquid, is compressed and opposes the movement of the partition and as a result the advance outer and intermediate plates 21 are straightened out as will appear from the dotted line showing in Fig. 2. As the plates are straightened the size of the passageway 22 is reduced thus preventing a free escape of the fluid from the compartment under pressure past the partition and increasing the resistance to the movement of the partition. When the axle returns to its normal position, the partition moves back from the dotted to the full line position and the outer and intermediate plates now in advance are straightened out in the manner described above with similar results.

It will be noted that the amount of resistance of the shock absorbing device is controlled by the passageway since obviously the resistance increases as the size of the passageway decreases. A slow relative movement of the parts has little effect on the size of the passageway and the liquid passes back and forth freely. A heavy or sudden shock however, tends to close the passageway and thus increase the amount of resistance. The resistance of the shock absorbing device increases therefore, as the size of the passageway decreases.

Other embodiments of the invention may be used without departing from the spirit or scope thereof as set forth in the annexed claims.

Having thus described my invention, what I claim and desire to secure by Letters Patent is:—

1. In a shock absorber, a fluid containing casing, a resilient partition movable in said casing and dividing the casing into two compartments with a passageway between them, said partition having its fluid engaging surface normally distorted out of a single plane but adapted to flatten out into a single plane under the effect of a sudden or severe shock, thereby increasing the effective area of the partition.

2. A shock absorber comprising a fluid containing casing, a movable, extensible partition in said casing having a fluid engaging surface and dividing the casing into two compartments with a passageway between them, said partition being constructed and arranged to increase in effective area thereby decreasing the size of the passageway upon the application of a force beyond a predetermined amount.

3. A shock absorber comprising a fluid containing casing, a partition movable relatively to the casing and dividing the casing into compartments connected by a passageway, the area of which is substantially constant when the partition is not subject to pressure and up to the point of application of force of a predetermined amount, said partition having a fluid engaging surface constructed and arranged to extend toward the casing wall to interrupt a greater area of the passageway upon the application of force beyond the predetermined amount.

4. A shock absorbing device comprising a fluid containing casing, an extensible partition movable within and relatively to said casing and dividing the casing into two compartments with a passageway between them, said partition being so constructed and arranged in said casing that one edge of the partition will approach the wall of the casing upon the application of force beyond a predetermined amount to said partition.

5. A shock absorbing device comprising a fluid containing casing divided into two compartments connected by a passageway of varying size and a yieldable partition made up of a series of five spring plates those at each end of the series being the longest and being outwardly curved for separating the compartments and regulating the size of the passageway whereby the size is decreased as the shock is increased.

6. A shock absorbing device comprising a fluid containing chamber, a spring plate partition movable relatively to said chamber, said partition being normally curved along its length to carry its free end away from the opposing wall of the chamber.

7. A shock absorbing device comprising a fluid containing casing, a spring plate partition movable relatively to said casing, said partition being bent along the length thereof to carry the free end of the partition in a direction away from the opposing wall of the casing and said partition having greater flexibility adjacent said free end whereby when the partition is moved against the opposing fluid it will be straightened out under the effect of the opposing pressure.

8. A shock absorbing device comprising, in combination, a fluid containing casing, a spring plate partition dividing said casing into compartments, said partition being pivoted at one end and projecting freely toward an opposing wall of the casing and its other end being curved along its length to carry said free end away from the opposing wall to thereby provide a passageway between the compartments, said partition having a substantially radial and relatively rigid portion adjacent the pivoted end and having a more flexible portion adjacent the free end of the partition whereby the latter is straightened as it is moved against the opposing pressure of the contained fluid, to thereby decrease the size of the passageway.

9. In a motor vehicle, a shock absorbing device comprising in combination a fluid containing chamber, a partition therein, said partition being composed of a plurality of laminated spring plates, the outer ones being longer than the inner ones and outwardly curved and means for imparting relative movement to said chamber and partition whereby one of said outer spring plates is straightened out to resist such relative movement.

10. In a motor vehicle, a shock absorbing device comprising in combination, a fluid containing chamber, a partition therein, said partition being composed of a plurality of laminated spring plates the outer ones being longer than the inner ones and outwardly curved and means for imparting relative movement to said chamber and partition whereby one of said outer spring plates is straightened out to resist such relative movement in one direction and the other of said outer spring plates is straightened out to resist such relative movement in the reverse direction.

11. In a motor vehicle, a shock absorbing device, comprising in combination, a fluid containing chamber, a partition dividing said chamber into compartments and providing a variable passage for the fluid, said partition being composed of a plurality of laminated spring plates, the outer ones being longer than the inner ones, and outwardly curved and means for imparting relative movement to said chamber and partition whereby one of said outer spring plates is straightened out to reduce the size of said variable passage and to resist such relative movement.

12. In a motor vehicle, a shock absorbing device comprising in combination, a fluid containing chamber, a partition dividing said chamber into compartments and providing a variable passage for the fluid, said partition being composed of a plurality of laminated spring plates, the outer ones being longer than the inner ones, and outwardly curved, and means for imparting relative movement to said chamber and partition whereby one of said outer spring plates is straightened out to reduce the size of said variable passage and to resist such relative movement in the reverse direction.

13. A shock absorbing device having an oil containing casing, a partition in said casing relatively movable thereto, said partition comprising a substantially rigid radial member and flexible lateral members on opposite side of said radial member and curved along their lengths in opposite directions to carry their free ends away from the opposing wall of the casing to thereby provide a passageway between the two compartments formed by the partition, said flexible members possessing greater flexibility toward their free ends than near their pivoted ends whereby as the partition is moved in opposite directions under the application of force against the pressure of the fluid, said members will be alternately straightened out under said pressure.

In testimony whereof I affix my signature.

MILTON TIBBETTS.